(12) United States Patent
Nakayama

(10) Patent No.: US 11,043,697 B2
(45) Date of Patent: Jun. 22, 2021

(54) NONAQUEOUS ELECTROLYTE SECONDARY BATTERY INCLUDING LITHIUM FLUOROSULFONATE

(71) Applicant: TOYOTA JIDOSHA KABUSHIKI KAISHA, Toyota (JP)

(72) Inventor: Tetsuri Nakayama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 16/112,972

(22) Filed: Aug. 27, 2018

(65) Prior Publication Data

US 2019/0081355 A1 Mar. 14, 2019

(30) Foreign Application Priority Data

Sep. 11, 2017 (JP) .............................. JP2017-174331

(51) Int. Cl.
*H01M 6/04* (2006.01)
*H01M 10/0567* (2010.01)
(Continued)

(52) U.S. Cl.
CPC ......... *H01M 10/0567* (2013.01); *H01M 4/48* (2013.01); *H01M 4/505* (2013.01);
(Continued)

(58) Field of Classification Search
CPC .. H01M 4/505; H01M 4/525; H01M 10/0525; H01M 10/052; H01M 10/0567; H01M 2004/028; H01M 2300/0025
See application file for complete search history.

(56) References Cited

U.S. PATENT DOCUMENTS

2012/0308881 A1 12/2012 Tokuda et al.
2013/0337305 A1 12/2013 Nagai et al.
(Continued)

FOREIGN PATENT DOCUMENTS

CN 103403942 A 11/2013
CN 104781976 A 7/2015
(Continued)

OTHER PUBLICATIONS

Robert S. Marvin, "The Accuracy of Measurements of Viscosity of Liquids", Journal of Research of the National Bureau of Standards—A. Physics and Chemistry, Nov.-Dec. 1971, vol. 75A, No. 6, pp. 535-540.
(Continued)

*Primary Examiner* — Raymond Alejandro
(74) *Attorney, Agent, or Firm* — Sughrue Mion, PLLC

(57) ABSTRACT

Provided is a nonaqueous electrolyte secondary battery in which lithium fluorosulfonate is added to a nonaqueous electrolytic solution and which demonstrates excellent low-temperature performance. The nonaqueous electrolyte secondary battery disclosed herein includes a positive electrode, a negative electrode, and a nonaqueous electrolytic solution. The positive electrode includes a positive electrode active material layer. The positive electrode active material layer includes, as a positive electrode active material, a lithium transition metal composite oxide including at least lithium, nickel, manganese, and cobalt. The nonaqueous electrolytic solution includes lithium fluorosulfonate. A dibutyl phthalate absorption amount of the positive electrode active material is 28 mL/100 g or more and 45 mL/100 g or less. A content of lithium fluorosulfonate in the nonaqueous electrolytic solution is 0.15% by mass or more and 1.0% by mass or less.

8 Claims, 3 Drawing Sheets

(51) Int. Cl.
*H01M 4/505* (2010.01)
*H01M 10/0525* (2010.01)
*H01M 4/525* (2010.01)
*H01M 4/48* (2010.01)
*H01M 10/056* (2010.01)
*H01M 10/052* (2010.01)
*H01M 4/587* (2010.01)
*H01M 50/409* (2021.01)
*H01M 4/02* (2006.01)

(52) U.S. Cl.
CPC ........... *H01M 4/525* (2013.01); *H01M 4/587* (2013.01); *H01M 10/052* (2013.01); *H01M 10/056* (2013.01); *H01M 10/0525* (2013.01); *H01M 50/409* (2021.01); *H01M 2004/028* (2013.01); *H01M 2300/0025* (2013.01)

(56) References Cited

U.S. PATENT DOCUMENTS

| | | |
|---|---|---|
| 2014/0017573 A1 | 1/2014 | Otsuki et al. |
| 2014/0255783 A1 | 9/2014 | Takahata et al. |
| 2014/0272604 A1 | 9/2014 | Lim et al. |
| 2015/0188183 A1 | 7/2015 | Nagai et al. |
| 2016/0226106 A1 | 8/2016 | Minami et al. |
| 2017/0077550 A1* | 3/2017 | Nishie ................. H01M 10/052 |
| 2017/0092979 A1* | 3/2017 | Chiga ............... H01M 10/0422 |
| 2019/0081349 A1 | 3/2019 | Nakayama |

FOREIGN PATENT DOCUMENTS

| | | |
|---|---|---|
| CN | 105845979 A | 8/2016 |
| JP | 2011-187440 A | 9/2011 |
| JP | 2012-195224 A | 10/2012 |
| JP | 2014-011070 A | 1/2014 |
| JP | 2015-037012 A | 2/2015 |
| JP | 5709010 B2 | 4/2015 |
| JP | 2016143454 A | 8/2016 |
| KR | 10-2014-0083029 A | 7/2014 |
| WO | 2011/108119 A1 | 9/2011 |

OTHER PUBLICATIONS

U.S. Appl. No. 16/113,093, filed Aug. 27, 2018.
Office Action dated Jan. 27, 2020, issued by the U.S. Appl. No. 16/113,093.
Office Action dated Jul. 10, 2020, issued by the U.S. Appl. No. 16/113,093.
Advisory Action dated Nov. 2, 2020, issued by the U.S. Appl. No. 16/113,093.
Office Action dated Dec. 22, 2020, issued by the U.S. Appl. No. 16/113,093.

* cited by examiner

NONAQUEOUS ELECTROLYTE SECONDARY BATTERY INCLUDING LITHIUM FLUOROSULFONATE

BACKGROUND

1. Field of the Invention

The present teaching relates to a nonaqueous electrolyte secondary battery. The present application claims priority based on Japanese Patent Application No. 2017-174331 filed on Sep. 11, 2017, the entire contents of which are incorporated herein by reference.

2. Description of the Related Art

In recent years, nonaqueous electrolyte secondary batteries such as lithium ion secondary batteries have been advantageously used as portable power sources for personal computers, mobile terminals and the like, and as driving power sources for vehicles such as electric vehicles (EV), hybrid vehicles (HV), and plug-in hybrid vehicles (PHV).

With the widespread use of nonaqueous electrolyte secondary batteries, further improvement in performance is desired. A technique of adding lithium fluorosulfonate to a nonaqueous electrolytic solution in order to improve the performance of a nonaqueous electrolyte secondary battery, is known (see, for example, Japanese Patent Application Publication No. 2011-187440). As the positive electrode active material, lithium transition metal composite oxide is generally used as described in Japanese Patent Application Publication No. 2011-187440 (in particular, paragraph 0280). Generally, the lithium transition metal composite oxide is in the form of spherical particles which are secondary particles formed by aggregation of primary particles as described in Japanese Patent Application Publication No. 2011-187440 (especially paragraph 0289).

SUMMARY OF THE INVENTION

However, as a result of intensive research conducted by the inventor of the present teaching, it was found that the technique disclosed in Japanese Patent Application Publication No. 2011-187440 has a problem in low-temperature performance. Specifically, it was found that the technique disclosed in Japanese Patent Application Publication No. 2011-187440 has a problem that the discharge capacity is not sufficient when large current flows at low temperature.

In view of the above, it is an object of the present teaching to provide a nonaqueous electrolyte secondary battery in which lithium fluorosulfonate is added to a nonaqueous electrolytic solution and which demonstrates excellent low-temperature performance.

The nonaqueous electrolyte secondary battery disclosed herein includes a positive electrode, a negative electrode, and a nonaqueous electrolytic solution. The positive electrode includes a positive electrode active material layer. The positive electrode active material layer includes, as a positive electrode active material, a lithium transition metal composite oxide including at least lithium, nickel, manganese, and cobalt. The nonaqueous electrolytic solution includes lithium fluorosulfonate. A dibutyl phthalate (DBP) absorption amount of the positive electrode active material is 28 mL/100 g or more and 45 mL/100 g or less. A content of lithium fluorosulfonate in the nonaqueous electrolytic solution is 0.15% by mass or more and 1.0% by mass or less.

Where the DBP absorption amount of the positive electrode active material is less than 28 mL/100 g, the retention property of the nonaqueous electrolytic solution in the positive electrode active material decreases, formation of a coating film having good ion conductivity (in particular, the conductivity of ions serving as charge carriers) on the surface of the positive electrode active material becomes uneven, and electric resistance increases, which results in poor low-temperature performance. When the DBP absorption amount of the positive electrode active material exceeds 45 mL/100 g, the strength of the positive electrode active material particles decreases and cracks occur, which results in deterioration of current collection property and poor low-temperature performance. Alternatively, the number of the reaction active points with the nonaqueous electrolytic solution increases to excessively form a coating film, which results in poor low-temperature performance. Where the content of lithium fluorosulfonate is less than 0.15% by mass, the formation of a coating film on the surface of the positive electrode active material becomes insufficient and the ion conductivity (in particular, the conductivity of ions serving as charge carriers) is lowered, which apparently results in increased electric resistance and deteriorated low-temperature performance. Where the content of lithium fluorosulfonate exceeds 1.0% by mass, the amount of the coating film formed becomes too large and the electron conductivity decreases, which apparently results in increased electric resistance and deteriorated low-temperature performance.

Therefore, by adequately controlling the liquid retention property of the positive electrode active material and the content of lithium fluorosulfonate in the nonaqueous electrolytic solution, it is possible to form a uniform coating film having good ion conductivity (in particular, the conductivity of ions serving as charge carriers) which is derived from lithium fluorosulfonate on the surface of the positive electrode active material. Because of such features, it is possible to provide a nonaqueous electrolyte secondary battery in which lithium fluorosulfonate is added to a nonaqueous electrolytic solution and which excels in low-temperature performance.

In a desired aspect of the nonaqueous electrolyte secondary battery disclosed herein, a content of nickel with respect to a total content of nickel, manganese, and cobalt in the lithium transition metal composite oxide is 34 mol % or more.

Because of such a feature, the electric resistance of the nonaqueous electrolyte secondary battery decreases and the capacity increases.

In a desired aspect of the nonaqueous electrolyte secondary battery disclosed herein, the nonaqueous electrolytic solution further includes lithium bis(oxalato)borate.

Because of such a feature, the lithium bis(oxalato)borate promotes the decomposition reaction of the nonaqueous electrolytic solution, a more uniform coating film can be obtained, and the low-temperature performance of the nonaqueous electrolyte secondary battery can be further improved.

In a more desired aspect, the content of lithium bis(oxalato)borate in the nonaqueous electrolytic solution is 0.1% by mass or more.

Because of such a feature, the coating film improvement effect demonstrated by lithium bis(oxalato)borate is enhanced, and the low-temperature performance can be further improved.

In a further desired aspect, a content of lithium bis (oxalato)borate in the nonaqueous electrolytic solution is 0.5% by mass or more.

Because of such a feature, the coating film improvement effect demonstrated by lithium bis(oxalato)borate is further enhanced, and the low-temperature performance can be much further improved.

In a desired aspect of the nonaqueous electrolyte secondary battery disclosed herein, the nonaqueous electrolytic solution further includes lithium difluorophosphate.

Because of such a feature, it is possible to further improve the ion conductivity (in particular, the conductivity of ions serving as charge carriers) of the coating film, and it is possible to further improve the low-temperature performance of the nonaqueous electrolyte secondary battery.

In a more desired aspect, a content of lithium difluorophosphate in the nonaqueous electrolytic solution is 0.1% by mass or more.

Because of such a feature, the coating film improvement effect demonstrated by lithium difluorophosphate is enhanced, and the low-temperature performance can be further improved.

In a further desired aspect, the content of lithium difluorophosphate in the nonaqueous electrolytic solution is 0.5% by mass or more.

Because of such a feature, the coating film improvement effect demonstrated by lithium difluorophosphate is further enhanced, and the low-temperature performance can be much further improved.

DESCRIPTION OF THE PREFERRED EMBODIMENT

Figure 1:
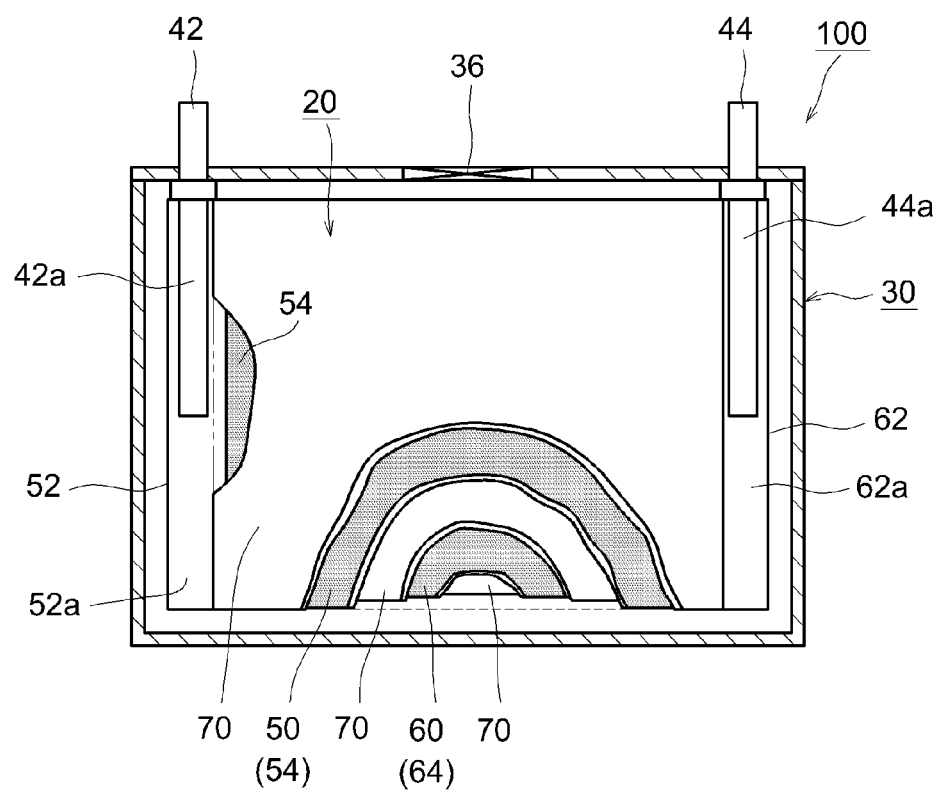
FIG. 1 is a cross-sectional view schematically showing the internal structure of a lithium ion secondary battery according to one embodiment of the present teaching.

An embodiment of the present teaching will be described below with reference to the drawings. Incidentally, the matters other than those specifically mentioned in the present specification and necessary for the implementation of the present teaching (for example, the general configuration and production process of a nonaqueous electrolyte secondary battery not characterizing the present teaching) can be understood as design matters to be addressed by a person skilled in the art on the basis of the related art in the pertinent field. The present teaching can be carried out based on the contents disclosed in this specification and technical common sense in the field. In addition, in the following drawings, the same reference numerals are attached to members and parts that exhibit the same action. Further, the dimensional relationship (length, width, thickness, and the like) in each drawing does not reflect the actual dimensional relationship.

In this specification, the term "secondary battery" generally refers to a power storage device that can be repeatedly charged and discharged, and this term is inclusive of power storage elements such as a so-called power storage battery and an electric double layer capacitor.

Further, the term "nonaqueous electrolyte secondary battery" refers to a battery including a nonaqueous electrolytic solution (typically, a nonaqueous electrolytic solution including a supporting electrolyte in a nonaqueous solvent).

Hereinafter, the present teaching will be described in detail by taking a flat angular lithium ion secondary battery having a flat-shaped wound electrode body and a flat-shaped battery case as an example, but the present teaching is not intended to be limited to the configuration described in the embodiment.

A lithium ion secondary battery 100 shown in FIG. 1 is a sealed battery constructed by accommodating a flat-shaped wound electrode body 20 and a nonaqueous electrolytic solution (not shown) in a flat angular battery case (that is, an outer case) 30. The battery case 30 is provided with a positive electrode terminal 42 and a negative electrode terminal 44 for external connection and a thin safety valve 36 which is set so as to release an internal pressure when the internal pressure of the battery case 30 rises to a predetermined level or higher. In addition, an injection port (not shown) for injecting the nonaqueous electrolytic solution is provided in the battery case 30. The positive electrode terminal 42 is electrically connected to the positive electrode current collector plate 42a. The negative electrode terminal 44 is electrically connected to the negative electrode current collector plate 44a. As a material of the battery case 30, for example, a lightweight metal material having good thermal conductivity such as aluminum is used.

Figure 2:
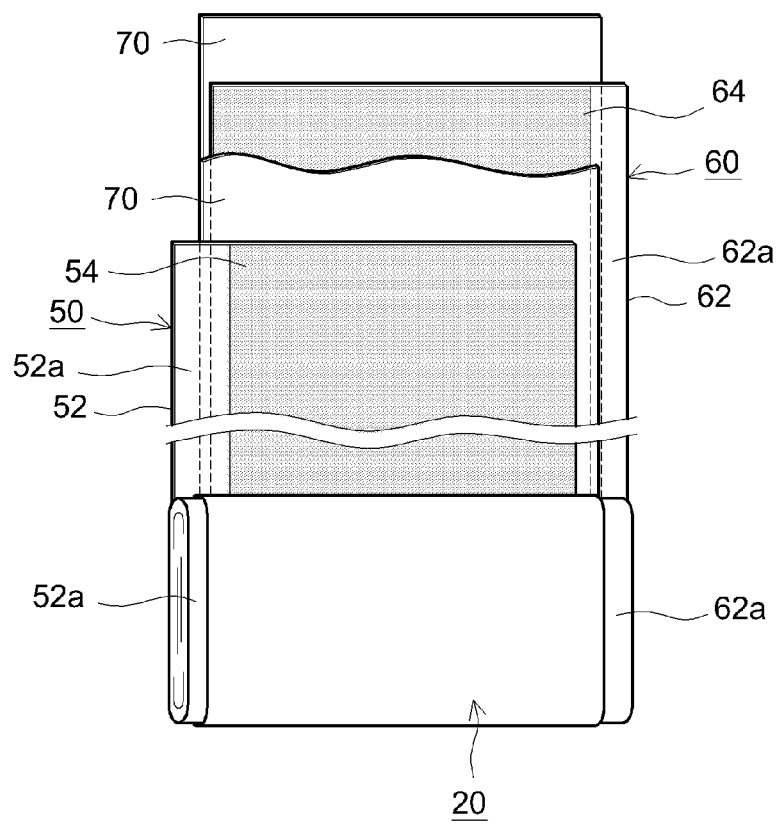
FIG. 2 is a schematic view showing the configuration of a wound electrode body of a lithium ion secondary battery according to one embodiment of the present teaching.

As shown in FIGS. 1 and 2, the wound electrode body 20 has a structure obtained by laminating a positive electrode sheet 50 in which a positive electrode active material layer 54 is formed along the longitudinal direction on one side or both sides (here, both sides) of an elongated positive electrode current collector 52 and a negative electrode sheet 60 in which a negative electrode active material layer 64 is formed along the longitudinal direction on one side or both sides (here, both sides) of an elongated negative electrode collector 62, with two elongated separator sheets 70 being interposed therebetween, and winding the laminate in the longitudinal direction. A positive electrode active material layer non-formation portion 52a (that is, a portion where the positive electrode active material layer 54 is not formed and the positive electrode current collector 52 is exposed) and a negative electrode active material layer non-formation portion 62a (that is, a portion where the negative electrode active material layer 64 is not formed and the negative electrode current collector 62 is exposed), which are formed to protrude to the outside from both ends of the wound electrode body 20 in the winding axis direction (that is, a sheet width direction orthogonal to the longitudinal direction) are joined to a positive electrode current collector plate 42a and a negative electrode current collector plate 44a, respectively.

The positive electrode current collector 52 constituting the positive electrode sheet 50 is exemplified by an aluminum foil or the like.

The positive electrode active material layer 54 includes, as a positive electrode active material, a lithium transition metal composite oxide including at least lithium, nickel, manganese, and cobalt. That is, in the present embodiment, a lithium-nickel-manganese-cobalt-based composite oxide is used as the positive electrode active material. The lithium-nickel-manganese-cobalt-based composite oxide desirably has a layered rock salt type structure.

The content of nickel with respect to the total content of nickel, manganese, and cobalt in the lithium-nickel-manganese-cobalt-based composite oxide is not particularly limited, but is desirably 34 mol % or more. In this case, the electric resistance of the lithium ion secondary battery 100 decreases and the capacity increases. From the viewpoint of not lowering the performance of the lithium-nickel-manganese-cobalt-based composite oxide as the positive electrode active material, the content of nickel with respect to the total content of nickel, manganese, and cobalt is desirably 60 mol % or less.

The lithium-nickel-manganese-cobalt-based composite oxide may further include a metal element other than lithium, nickel, manganese, and cobalt (for example, Zr, Mo, W, Mg, Ca, Na, Fe, Cr, Zn, Si, Sn, Al, and the like).

A lithium-nickel-manganese-cobalt-based composite oxide represented by a following Formula (I) can be advantageously used as the positive electrode active material.

$$Li_aNi_xMn_yCo_zO_2 \tag{I}$$

Here, a satisfies 0.98≤a≤1.20; x, y and z satisfy x+y+z=1; x desirably satisfies 0.20≤x≤0.60, and more desirably 0.34≤x≤0.60; y desirably satisfies 0<y≤0.50, and more desirably 0<y≤0.40, and z desirably satisfies 0<z≤0.50, and more desirably 0<z≤0.40.

The dibutyl phthalate (DBP) absorption amount of the positive electrode active material is 28 mL/100 g or more and 45 mL/100 g or less.

Where the DBP absorption amount of the positive electrode active material is less than 28 mL/100 g, the retention property of the nonaqueous electrolytic solution in the positive electrode active material (referred to hereinbelow simply as "liquid retention property") decreases, formation of a coating film having good ion conductivity (in particular, conductivity of ions (for example. Li) serving as charge carriers) on the surface of the positive electrode active material becomes uneven, and electric resistance increases, which results in poor low-temperature performance. When the DBP absorption amount of the positive electrode active material exceeds 45 mL/100 g, the strength of the positive electrode active material particles decreases and cracks occur, which results in deterioration of current collection property and poor low-temperature performance. Alternatively, the number of reaction active points with the nonaqueous electrolytic solution increases, thereby excessively forming a coating film, which results in poor low-temperature performance.

The DBP absorption amount of a general positive electrode active material in the form of secondary particles (so-called solid particles) in which primary particles are aggregated is about 25 mL/100 g or less. Therefore, in the present embodiment, a positive electrode active material having a DBP absorption amount higher than the DBP absorption amount of the conventionally used positive electrode active material is used. The DBP absorption amount is a parameter correlated with the retention property with respect to a nonaqueous electrolytic solution. Therefore, the retention property of a general positive electrode active material with respect to a nonaqueous electrolytic solution is lower than that of the positive electrode active material used in the present embodiment. This is because, in a general positive electrode active material in the form of secondary particles in which primary particles are aggregated, voids between the primary particles are narrow and the nonaqueous electrolytic solution hardly permeates into the inside of the positive electrode active material particles. Lithium fluorosulfonate is slightly decomposed in repeated charging and discharging, and a coating film derived from lithium fluorosulfonate is formed on the surface of the positive electrode active material. In the related art, the diffusion property of ions (for example, lithium ions) serving as charge carriers in the coating film is low, and the coating film increases battery resistance, so that low-temperature performance (in particular, discharge capacity when large current flows at low temperature) is poor. This is apparently because the liquid retention property of a general positive electrode active material is poor and the contact area of the positive electrode active material particles with the nonaqueous electrolytic solution is small, which results in local concentration of current and uneven formation of the coating film. Another conceivable reason is that an inorganic compound component such as $Li_2SO_4$ having low ion conductivity is formed in the coating film.

The DBP absorption amount of the positive electrode active material is desirably 30 mL/100 g or more and 45 mL/100 g or less, and more desirably 32 mL/100 g or more and 40 mL/100 g or less.

The DBP absorption amount can be measured according to the method described in JIS K 6217-4 (2008).

Hollow particles (hereinafter also referred to as "particles having a perforated hollow structure") having a shell portion composed of a lithium-nickel-manganese-cobalt-based composite oxide having a layered rock salt type structure, a hollow portion formed inside the shell portion, and a through hole penetrating the shell portion are desirably used as the positive electrode active material because such positive electrode active material can easily have a high DBP absorption amount of 28 mL/100 g or more and 45 mL/100 g or less.

Figure 3:
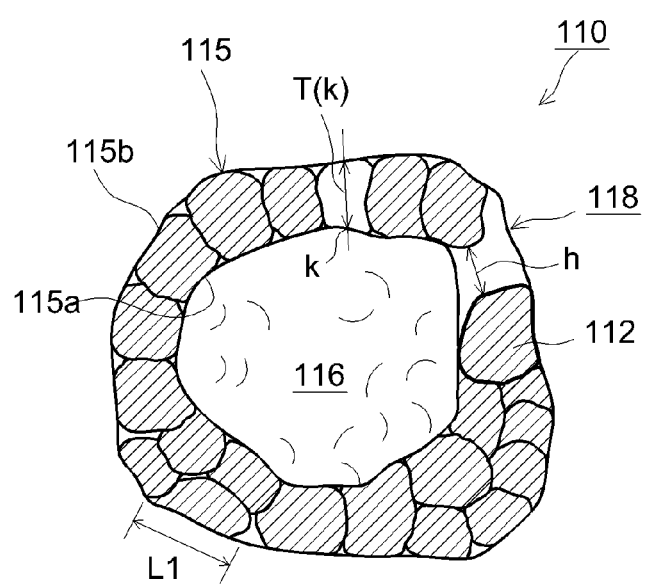
FIG. 3 is a schematic cross-sectional view showing an example of positive electrode active material particles having a perforated hollow structure.

FIG. 3 schematically shows a cross-sectional view of an example of a positive electrode active material particle having a perforated hollow structure. As shown in FIG. 3, a positive electrode active material particle 110 has a shell portion 115 and a hollow portion 116. The shell portion 115 has a form in which primary particles 112 aggregate in a spherical shell shape. In a desired embodiment, the shell portion 115 has a form in which primary particles 112 are annularly connected in the cross section of the shell portion. The annular portion may have a form in which the primary particles 112 are consecutively (in single layer) connected over the entire shell portion 115, or a form having a portion in which two or more primary particles 112 are stacked (in multiple layers) and connected.

From the viewpoint of output characteristics (particularly, output characteristics in a low SOC region), a major axis L1 of the primary particle 112 constituting the positive electrode active material particles 110 is desirably 1 μm or less, more desirably 0.2 μm or more and 1 μm or less, and even more desirably 0.3 μm or more and 0.8 μm or less.

The major axis L1 of the primary particle 112 can be determined, for example, based on an observation image of the positive electrode active material particle 110 obtained with an electron microscope (for example, SEM or the like).

The thickness of the shell portion 115 of the positive electrode active material particle 110 is desirably 0.1 μm or more and 2 μm or less, more desirably 0.2 μm or more and 1.8 μm or less, and even more desirably 0.5 μm or more and 1.5 μm or less because the internal resistance reduction effect, durability, and reliability during overcharge are high.

The thickness of the shell portion 115, as referred to herein, is the average value of the shortest distances T(k) from an arbitrary position k on an inner side surface 115a of the shell portion 115 to an outer side surface 115b of the shell portion 115 in the cross section of the positive electrode active material particle 110.

The thickness of the shell portion 115 can be determined, for example, by acquiring an observation image of the cross section of the positive electrode active material particle 110 with an electron microscope (for example, SEM or the like), measuring the dimension T(k) at three or more (desirably five or more) arbitrary positions with respect to at least 10 (for example, 20 or more) positive electrode active material particles 110, and finding the average value thereof.

As shown in FIG. 3, the positive electrode active material particle 110 has a through hole 118. The through hole 118 penetrates the shell portion 115 and spatially connects the hollow portion 116 and the outside of the positive electrode active material particle 110.

It is desirable that the number of the through holes 118 in the positive electrode active material particles 110 be 1 or more and 10 or less (particularly 1 or more and 5 or less) per particle.

The opening width h of the through hole 118 is desirably 0.01 µm or more, and more desirably 0.05 µm or more so as to increase the DBP value, in other words, so that the nonaqueous electrolytic solution could move back and forth between the inside and the outside of the positive electrode active material particle 110. Further, the opening width h of the through hole 118 is desirably 2 µm or less on average, more desirably 1 µm or less on average, and even more desirably 0.5 µm or less on average.

The opening width h of the through hole 118 of the positive electrode active material particle 110 can be obtained based on the observation image of the cross section of the positive electrode active material particle 110 obtained with an electron microscope (for example, SEM or the like).

From the viewpoint of retention property of the nonaqueous electrolytic solution, it is desirable that the porosity of the positive electrode active material particles 110 be 20% or more, more desirably 23% or more, still more desirably 30% or more. In addition, from the viewpoint of the strength of the positive electrode active material particles 110, it is desirable that the porosity of the positive electrode active material particles 110 be 95% or less, more desirably 90% or less, and even more desirably 80% or less.

The porosity of the positive electrode active material particles 110 can be calculated as a proportion of the apparent cross-sectional area of the positive electrode active material particle 110 occupied by the hollow portion on the basis of the observation image of the cross section of the positive electrode active material particle 110 obtained with an electron microscope (for example, SEM or the like). For example, the porosity can be calculated by calculating a ratio ($C_V/C_T$) of an area $C_V$ occupied by the hollow portion 116 to a cross-sectional area $C_T$ apparently occupied by the positive electrode active material particle 110 in the electron microscopic image of the cross section of the positive electrode active material particles 110. The cross-sectional area $C_T$ apparently occupied by the positive electrode active material particle 110, as referred to herein, is the cross-sectional area occupied by the shell portion 115, the hollow portion 116, and the through hole 118 of the positive electrode active material particle 110. The porosity is desirably determined as the average value of at least 10 (for example, 20 or more) positive electrode active material particles 110.

The average hardness of the positive electrode active material particles 110 is desirably 0.5 MPa or more and 100 MPa or less because a battery that more stably exhibits high performance can be obtained.

The average hardness, as referred to herein, is an average value, for three or more particles, of values obtained by dynamic microhardness measurement conducted under the condition of a loading speed of 0.5 mN/sec to 3 mN/sec by using a flat diamond indenter having a diameter of 50 µm.

The structure of the positive electrode active material particles is not particularly limited as long as the DBP absorption amount is 28 mL/100 g or more and 45 mL/100 g or less, and the structure is not limited to the above-described perforated hollow structure. For example, the positive electrode active material particles may have a porous structure in which the DBP absorption amount is 28 mL/100 g or more and 45 mL/100 g or less. Positive electrode active material particles having a porous structure are exemplified by positive electrode active material particles in the form of secondary particles in which primary particles are aggregated by a spray calcination method so as to ensure high porosity.

A method for producing a positive electrode active material having the DBP absorption amount within the above range is not particularly limited. For example, such positive electrode active material can be prepared by the method disclosed in Japanese Patent No. 5709010.

The positive electrode active material layer 54 may further include a positive electrode active material other than the lithium-nickel-manganese-cobalt-based composite oxide within a range in which the effect of the present teaching is not impaired.

The content of the positive electrode active material is desirably 70% by mass or more, and more desirably 75% by mass or more in the positive electrode active material layer 54 (that is, with respect to the total mass of the positive electrode active material layer 54).

The positive electrode active material layer 54 may include components other than the positive electrode active material. Examples thereof include a conductive material, a binder, and the like.

For example, carbon black such as acetylene black (AB) or other carbon materials (for example, graphite or the like) can be advantageously used as the conductive material. The content of the conductive material in the positive electrode active material layer 54 is desirably 1% by mass or more and 15% by mass or less, and more desirably 3% by mass or more and 12% by mass or less.

For example, polyvinylidene fluoride (PVdF) or the like can be used as the binder. The content of the binder in the positive electrode active material layer 54 is desirably 1% by mass or more and 15% by mass or less, and more desirably 2% by mass or more and 12% by mass or less.

The negative electrode current collector 62 constituting the negative electrode sheet 60 can be exemplified by a copper foil or the like. For example, a carbon material such as graphite, hard carbon, soft carbon or the like can be used as the negative electrode active material to be included in the negative electrode active material layer 64. The graphite may be natural graphite or artificial graphite, and may be amorphous carbon-coated graphite in which graphite is coated with an amorphous carbon material. The negative electrode active material layer 64 may include components other than the active material, such as a binder and a thickener. For example, styrene butadiene rubber (SBR) or the like can be used as the binder. For example, carboxymethyl cellulose (CMC) or the like can be used as the thickener.

The content of the negative electrode active material in the negative electrode active material layer is desirably 90% by mass or more, and more desirably 95% by mass or more and 99% by mass or less. The content of the binder in the negative electrode active material layer is desirably 0.1% by mass or more and 8% by mass or less, and more desirably 0.5% by mass or more and 3% by mass or less. The content of the thickener in the negative electrode active material layer is desirably 0.3% by mass or more and 3% by mass or less, and more desirably 0.5% by mass or more and 2% by mass or less.

The separator 70 can be exemplified a porous sheet (film) made of a resin such as polyethylene (PE), polypropylene (PP), a polyester, cellulose, a polyamide and the like. Such a porous sheet may have a single layer structure or a laminate structure of two or more layers (for example, a three layer structure in which a PP layer is laminated on both surfaces of a PE layer). A heat-resistant layer (HRL) may be provided on the surface of the separator 70.

The nonaqueous electrolytic solution includes lithium fluorosulfonate.

The nonaqueous electrolytic solution typically includes a nonaqueous solvent and a supporting salt.

As the nonaqueous solvent, an organic solvent such as various carbonates, ethers, esters, nitriles, sulfones, lactones and the like usable for an electrolytic solution of a general lithium ion secondary battery can be used without particular limitation. Specific examples include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), trifluorodimethyl carbonate (TFDMC), and the like. Such nonaqueous solvents may be used singly or in appropriate combination of two or more thereof.

As the supporting salt, for example, a lithium salt such as $LiPF_6$, $LiBF_4$, $LiClO_4$ or the like (desirably $LiPF_6$) can be used. The concentration of the supporting salt is desirably 0.7 mol/L or more and 1.3 mol/L or less.

The content of lithium fluorosulfonate in the nonaqueous electrolytic solution is 0.15% by mass or more and 1.0% by mass or less.

Where the content of lithium fluorosulfonate is less than 0.15% by mass, the formation of a coating film on the surface of the positive electrode active material becomes insufficient and the ion conductivity (in particular, the conductivity of ions (for example, Li or the like) serving as charge carriers) is lowered, which apparently results in increased electric resistance and deteriorated low-temperature performance. Where the content of lithium fluorosulfonate exceeds 1.0% by mass, the amount of the coating film formed becomes too large and the electron conductivity decreases, which apparently results in increased electric resistance and deteriorated low-temperature performance.

The content of lithium fluorosulfonate in the nonaqueous electrolytic solution is desirably 0.2% by mass or more and 0.8% by mass or less, and more desirably 0.25% by mass or more and 0.75% by mass or less.

The nonaqueous electrolytic solution desirably further includes lithium bis(oxalato)borate. In this case, the lithium bis(oxalato)borate promotes the decomposition reaction of the nonaqueous electrolytic solution, a more uniform coating film can be obtained, and the low-temperature performance of the lithium ion secondary battery 100 is further improved. The content of lithium bis(oxalato)borate in the nonaqueous electrolytic solution is desirably 0.1% by mass or more, and more desirably 0.5% by mass or more, because the coating film improvement effect demonstrated by lithium bis(oxalato)borate is increased and the low-temperature performance of the lithium ion secondary battery 100 is further improved. Meanwhile, where the content of lithium bis(oxalato)borate is too high, the amount of the coating film formed becomes too large and the electric resistance can be increased. Therefore, the content of lithium bis(oxalato) borate in the nonaqueous electrolytic solution is desirably 1.0% by mass or less.

The nonaqueous electrolytic solution desirably further includes lithium difluorophosphate. In this case, it is possible to improve the ion conductivity (in particular, the conductivity of ions (for example. Li or the like) serving as charge carriers) of the coating film, and it is possible to further improve the low-temperature performance of the lithium ion secondary battery 100. The content of lithium difluorophosphate in the nonaqueous electrolytic solution is desirably 0.1% by mass or more, and more desirably 0.5% by mass or more, because the coating film improvement effect demonstrated by lithium difluorophosphate is increased, and the low-temperature performance of the lithium ion secondary battery 100 can be further improved. Meanwhile, where the content of lithium difluorophosphate is too high, the amount of the coating film formed becomes too large and the electric resistance can be increased. Therefore, the content of lithium difluorophosphate in the nonaqueous electrolytic solution is desirably 1.0% by mass or less.

As long as the effect of the present teaching is not remarkably impaired, the nonaqueous electrolytic solution may include components other than the above-mentioned components, for example, various additives such as a gas generating agent such as biphenyl (BP), cyclohexylbenzene (CHB), a thickener, and the like.

As described above, by using a lithium-nickel-manganese-cobalt-based composite oxide for a positive electrode active material and adequately controlling the liquid retention property of the positive electrode active material and the content of lithium fluorosulfonate in the nonaqueous electrolytic solution, it is possible to form a uniform coating film having good ion conductivity (in particular, the conductivity of ions (for example, Li or the like) serving as charge carriers) which is derived from lithium fluorosulfonate on the surface of the positive electrode active material. Therefore, by combining a positive electrode active material having a specific DBP absorption amount as an indicator of a nonaqueous electrolytic solution retention property and a nonaqueous electrolyte solution including a specific amount of lithium fluorosulfonate, it is possible to provide the lithium ion secondary battery 100 with excellent low-temperature performance (in particular, the discharge capacity when large current flows at low temperature).

The lithium ion secondary battery 100 configured as described above can be used for various purposes. Suitable applications include a driving power supply installed on a vehicle such as an electric vehicle (EV), a hybrid vehicle (HV), a plug-in hybrid vehicle (PHV), or the like. Typically, the lithium ion secondary battery 100 can also be used in the form of a battery pack in which a plurality of lithium ion secondary batteries 100 is connected in series and/or in parallel.

The rectangular lithium ion secondary battery 100 including the flat-shaped wound electrode body 20 has been described hereinabove by way of example. However, the nonaqueous electrolyte secondary battery disclosed herein can also be configured as a lithium ion secondary battery including a stacked electrode body. Further, the nonaqueous electrolyte secondary battery disclosed herein can also be configured as a cylindrical lithium ion secondary battery.

The nonaqueous electrolyte secondary battery disclosed herein can also be configured as a nonaqueous electrolyte secondary battery other than the lithium ion secondary battery.

Hereinafter, examples relating to the present teaching will be described, but the present teaching is not intended to be limited to the configurations shown in the examples.

Preparation of Evaluation Lithium Ion Secondary Batteries A1 to A7 and B1 to B4

Low-Temperature Performance Evaluation

For each of the evaluation lithium ion secondary batteries prepared as described hereinabove, the discharge capacity obtained when a large current was passed under a low-temperature environment of −15° C. was determined. Then, for each evaluation lithium ion secondary battery, the ratio of the discharge capacity was calculated when the discharge capacity of the evaluation lithium ion secondary battery B3 was set to 100. The results are shown in Table 1.

TABLE 1

| Battery No. | Content of LiFSO$_3$ (% by mass) | DBP absorption amount (mL/100 g) | Content of LiBOB (% by mass) | Content of LiPO$_2$F$_2$ (% by mass) | Low-temperature performance (capacity ratio) |
|---|---|---|---|---|---|
| A1 | 0.15 | 28 | 0.1 | 0.1 | 129 |
| A2 | 0.15 | 45 | 0.5 | 0.5 | 145 |
| A3 | 1.0 | 28 | 0.5 | 0.5 | 133 |
| A4 | 1.0 | 45 | 0.5 | 0.5 | 142 |
| A5 | 0.5 | 34 | 0.5 | 0.5 | 152 |
| A6 | 0.15 | 28 | 0 | 0 | 121 |
| A7 | 0.15 | 45 | 0 | 0 | 139 |
| B1 | 1.1 | 25 | 0.1 | 0.1 | 89 |
| B2 | 0.1 | 25 | 0.1 | 0.1 | 91 |
| B3 | 1.1 | 48 | 0.1 | 0.1 | 100 |
| B4 | 0.1 | 48 | 0.1 | 0.1 | 96 |

LiNi$_{0.34}$Co$_{0.33}$Mn$_{0.33}$O$_2$ (LNCM) with a layered rock-salt type structure having a DBP oil absorption amount shown in Table 1 as a positive electrode active material, acetylene black (AB) as a conductive material, and polyvinylidene fluoride (PVdF) as a binder were mixed with N-methyl-2-pyrrolidone (NMP) at a mass ratio of LNCM:AB:PVdF=100:13:13 to prepare a paste for forming a positive electrode active material layer. This paste was coated on an aluminum foil and dried to form a positive electrode active material layer. Subsequently, press treatment was performed to prepare a positive electrode sheet. In the evaluation lithium ion secondary batteries A1 to A7, B3 and B4, the above-described particles having the perforated hollow structure were used as the LNCM, and in the evaluation lithium ion secondary batteries B1 and B2, secondary particles (so-called solid particles) produced by aggregation of primary particles were used as the LNCM.

Further, natural graphite (C) as a negative electrode active material, styrene butadiene rubber (SBR) as a binder, and carboxymethyl cellulose (CMC) as a thickener were mixed with ion exchanged water at a ratio of C:SBR:CMC=98:1:1 to prepare a paste for forming a negative electrode active material layer. This paste was coated on a copper foil, dried, and pressed to prepare a negative electrode sheet.

A porous polyolefin sheet was prepared as a separator sheet.

A mixed solvent including ethylene carbonate (EC), ethyl methyl carbonate (EMC) and dimethyl carbonate (DMC) at a volume ratio of 1:1:1 was prepared, and LiPF$_6$ as a supporting salt was added to a concentration of 1.0 mol/L. Then, a nonaqueous electrolytic solution was prepared by adding lithium fluorosulfonate (LiFSO$_3$), lithium bis(oxalato)borate (LiBOB), and lithium difluorophosphate (LiPO$_2$F$_2$) so as to obtain the contents shown in Table 1.

The evaluation lithium ion secondary batteries A1 to A7 and B1 to B4 were prepared using the positive electrode sheet, the negative electrode sheet, the separator, and the nonaqueous electrolytic solution.

From the results shown in Table 1, it is understood that when the DBP absorption amount of the positive electrode active material is 28 mL/100 g or more and 45 mL/100 g or less and the content of lithium fluorosulfonate is 0.15% by mass or more and 1.0% by mass or less in the lithium ion secondary battery in which the lithium fluorosulfonate is added to the nonaqueous electrolytic solution, the discharge capacity is large when large current flows at low temperature.

Therefore, it is understood that the nonaqueous electrolyte secondary battery disclosed herein has excellent low-temperature performance.

Although specific examples of the present teaching have been described in detail above, these are merely illustrative and do not limit the scope of the claims. Techniques described in the claims include those in which the concrete examples exemplified hereinabove are variously modified and changed.

What is claimed is:

1. A nonaqueous electrolyte secondary battery comprising:
    a positive electrode;
    a negative electrode; and
    a nonaqueous electrolytic solution, wherein
    the positive electrode includes a positive electrode active material layer,
    the positive electrode active material layer includes, as a positive electrode active material, hollow particles having a shell portion composed of a lithium-nickel-manganese-cobalt-based composite oxide having a layered rock salt type structure, a hollow portion formed inside the shell portion, and a through hole penetrating the shell portion,
    the nonaqueous electrolytic solution includes lithium fluorosulfonate,
    a dibutyl phthalate absorption amount of the positive electrode active material is 28 mL/100 g or more and 45 mL/100 g or less, and a content of lithium fluorosulfonate in the nonaqueous electrolytic solution is 0.15% by mass or more and 1.0% by mass or less.

2. The nonaqueous electrolyte secondary battery according to claim 1, wherein a content of nickel with respect to a total content of nickel, manganese, and cobalt in the lithium-nickel-manganese-cobalt-based composite oxide is 34 mol % or more.

3. The nonaqueous electrolyte secondary battery according to claim 1, wherein the nonaqueous electrolytic solution further includes lithium bis(oxalato)borate.

4. The nonaqueous electrolyte secondary battery according to claim 3, wherein a content of lithium bis(oxalato)borate in the nonaqueous electrolytic solution is 0.1% by mass or more.

5. The nonaqueous electrolyte secondary battery according to claim 3, wherein a content of lithium bis(oxalato)borate in the nonaqueous electrolytic solution is 0.5% by mass or more.

6. The nonaqueous electrolyte secondary battery according to claim 1, wherein the nonaqueous electrolytic solution further includes lithium difluorophosphate.

7. The nonaqueous electrolyte secondary battery according to claim 6, wherein a content of lithium difluorophosphate in the nonaqueous electrolytic solution is 0.1% by mass or more.

8. The nonaqueous electrolyte secondary battery according to claim 6, wherein a content of lithium difluorophosphate in the nonaqueous electrolytic solution is 0.5% by mass or more.

* * * * *